No. 745,997. PATENTED DEC. 8, 1903.
H. V. BLAKE.
MACHINE FOR TESTING THE LUBRICATING POWER OF OILS.
APPLICATION FILED APR. 3, 1903.
NO MODEL.
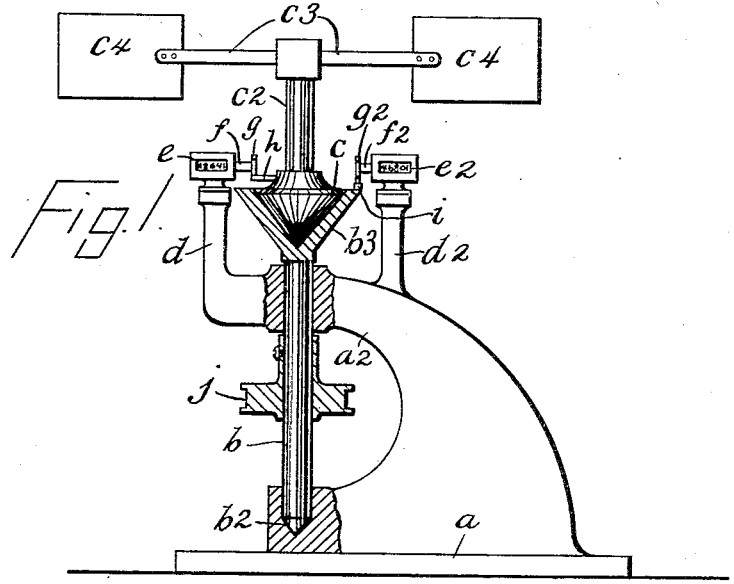
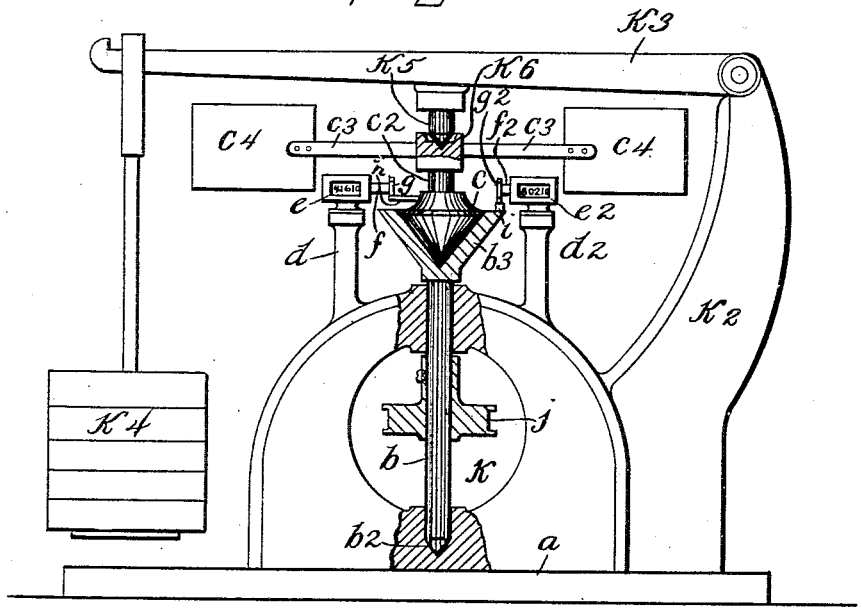
WITNESSES
S. L. Grittheimer
F. A. Stewart
INVENTOR
Hubert V. Blake
BY
Edgar Tate & Co
ATTORNEYS No. 745,997.                                           Patented December 8, 1903.

UNITED STATES PATENT OFFICE.

HUBERT VINCENT BLAKE, OF ACCRINGTON, ENGLAND.

MACHINE FOR TESTING THE LUBRICATING POWER OF OILS.

SPECIFICATION forming part of Letters Patent No. 745,997, dated December 8, 1903.

Application filed April 3, 1903. Serial No. 150,894. (No model.)

*To all whom it may concern:*

Be it known that I, HUBERT VINCENT BLAKE, a subject of the King of Great Britain, residing at Moorlands, Whalley Road, Accrington, in the county of Lancaster, England, have invented certain new and useful Improvements in Machines for Testing the Lubricating Power of Oils, of which the following is a specification, such as will enable those skilled in the art to which it appertains to make and use the same.

The object of this invention is to provide an improved machine or device for testing the lubricating power of various kinds of oils, greases, and other lubricants; and with this and other objects in view the invention consists in a machine of the class described constructed as hereinafter described and claimed.

The invention is fully disclosed in the following specification, of which the accompanying drawings form a part, in which the separate parts of my improvement are designated by suitable reference characters in each of the views, and in which—

Figure 1 is a sectional side elevation of a machine embodying my invention, and Fig. 2 a similar view showing a modification designed for use particularly for testing heavy oils or other lubricants.

In the practice of my invention I provide a base $a$, having an arm $a^2$, through which passes a vertically-arranged shaft $b$, which is pivoted in the base $a$, as shown at $b^2$, and which passes through the arm $a^2$ and is provided at its upper end with a conical holder $b^3$. Within the conical holder $b^3$ is placed a cone-shaped device $c$, having an upwardly-directed spindle $c^2$, with which is connected arms $c^3$, provided with fans or blades $c^4$.

The arm $a^2$ is provided at each side of the holder $b^3$ with standards $d$ and $d^2$, the upper ends of which are provided, respectively, with counters or registering devices $e$ and $e^2$, which are provided, respectively, with operating-shafts $f$ and $f^2$, said shafts being provided, respectively, with toothed or other operating-wheels $g$ and $g^2$, respectively.

The member $c$ is provided with a projecting finger $h$, which is designed to operate in connection with the wheel $g$, and thus operate the counter or registering device $e$, and the upper edge of the support $b^3$ is provided with a finger or similar device $i$, which is designed to operate in connection with the wheel $g^2$, by which the counter or registering device $e^2$ is operated.

The operation is as follows: A small quantity of oil or other lubricant to be tested is placed in the holder $b^3$, and the member $c$ is then dropped thereinto. The shaft $h$ is then rapidly revolved by means of a pulley $j$ for a certain length of time, and as the holder $b^3$ revolves the friction between the said holder and the member $c$ causes the latter to revolve also, but at a speed slower than that of the holder $b^3$ on account of the resistance offered by the vanes or blades $c^4$. After the machine has been run for a given time the number of revolutions made by the holder $b^3$ and those made by the member $c$ are noted and a record made of them. Then the second oil or lubricant is put into the holder after first cleaning the same, and the above-described operation is repeated. If the number of revolutions made by the member $c$ be less with the second oil or lubricant than with the first, it naturally follows that the friction between the holder and the member $c$ has been less, and therefore the second oil or lubricant is the better of the two.

My invention is not limited to the form of the holder $b^3$ and the conical member $c$, and various forms of these parts may be adapted.

In Fig. 2 I have shown a modification in which the base $a$ is provided with a central opening $k$, and the shaft $b$ passes vertically through the top portion of said base, and said base is also provided with an arm $k^2$, to which is pivoted a lever $k^3$, from which is suspended a number of weights $k^4$, and the lever $k^3$ is provided with a pivotal point $k^5$, which bears on the head $k^6$ of the spindle $c^2$. This form of construction is especially designed for use in testing heavy oils or lubricants for heavy machines, and the weights $k^4$ are used for pressing the member $c$ firmly into the holder $b^3$. The operation with this form of construction will be the same as with that shown in Fig. 1; but it will be necessary to raise the lever $k^3$ in order to place the member $c$ in position, and the said lever and weights are, as will be understood, designed for the purpose of increasing friction.

Having fully described my invention, what I claim as new, and desire to secure by Letters Patent, is—

1. A device of the class described comprising a base, a vertically-arranged shaft mounted therein and provided at its upper end with a holder, a member mounted in said holder and provided with an upwardly-directed spindle having fans at its upper ends, and two counters or registering devices supported adjacent to the holder one of which is adapted to be operated by the said member and the other by the holder, substantially as shown and described.

2. A device of the class described comprising a base, a vertically-arranged shaft mounted therein and provided at its upper end with a holder, a member mounted in said holder and provided with an upwardly-directed spindle having fans at its upper ends, two counters or registering devices supported adjacent to the holder one of which is adapted to be operated by the said member and the other by the holder, and means for supplying pressure to the upper end of the said spindle, substantially as shown and described.

In testimony that I claim the foregoing as my invention I have signed my name, in presence of the subscribing witnesses, this 24th day of March, 1903.

HUBERT VINCENT BLAKE.

Witnesses:
RICHARD WILDING,
WILLIAM HENRY HALSTEAD.